G. SPARANO.
BOTTLE AND STOPPER THEREFOR.
APPLICATION FILED APR. 17, 1908.

917,675.

Patented Apr. 6, 1909.

Witnesses

Inventor
Gennaro Sparano
By Victor J. Evans
Attorney

UNITED STATES PATENT OFFICE.

GENNARO SPARANO, OF PHILADELPHIA, PENNSYLVANIA.

BOTTLE AND STOPPER THEREFOR.

No. 917,675.      Specification of Letters Patent.      Patented April 6, 1909.

Application filed April 17, 1908. Serial No. 427,717.

*To all whom it may concern:*

Be it known that I, GENNARO SPARANO, a subject of the King of Italy, residing at Philadelphia, in the county of Philadelphia and State of Pennsylvania, have invented new and useful Improvements in Bottles and Stoppers Therefor, of which the following is a specification.

This invention relates to bottles and stoppers therefor, and one of the principal objects of the same is to provide a bottle designed more especially for containing tooth powder in which the stopper is provided with a cup or receptacle for holding a quantity of the powder so that it may be applied to a brush without waste.

Another object of the invention is to provide a bottle or receptacle for tooth powder having means for securing a tooth brush thereto and having a removable cover or stopper having a cup or receptacle in the upper portion thereof to contain a quantity of powder to be conveniently applied to a tooth brush without waste.

These and other objects may be attained by means of the construction illustrated in the accompanying drawings, in which—

Figure 1:
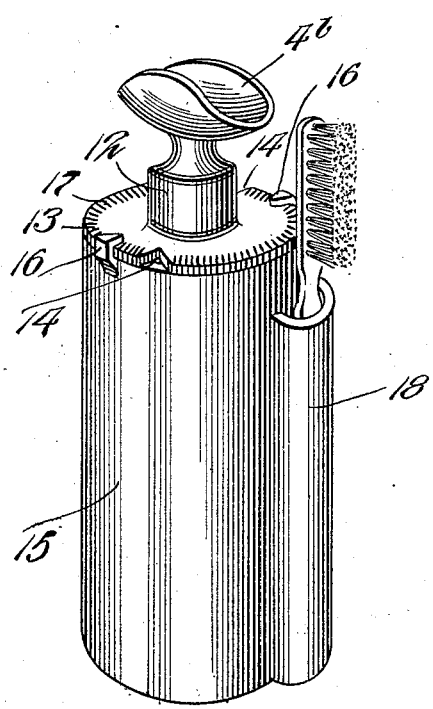
Figure 2:
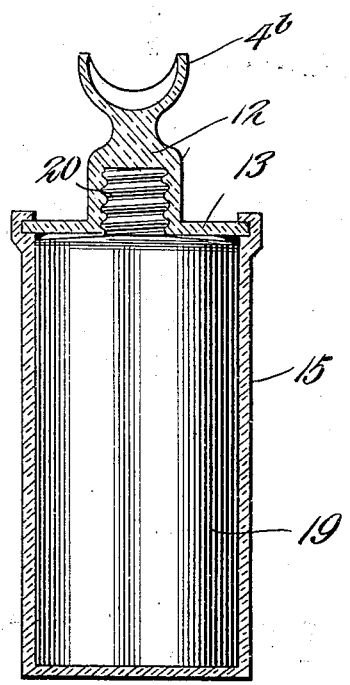
Figure 3:
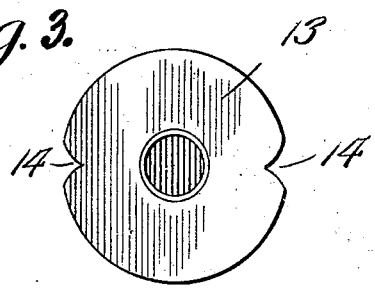
Figure 4:
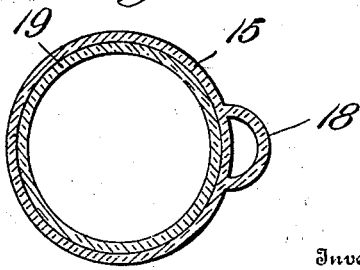

Figure 1 is a perspective view of a tooth powder container having a top provided with a cup or container for a quantity of powder and an outer receptacle with tooth brush holder. Fig. 2 is a vertical sectional view of the same. Fig. 3 is an underside plan view of the top or cover for the receptacle shown in Figs. 1 and 2. Fig. 4 is a transverse sectional view through Fig. 1, showing the outer receptacle or glass cover and the inner bottle or container for the powder.

Referring to the drawing, a cup 4$^b$ is formed upon the upper end of a closure 12 having a hollow threaded neck adapted to engage the threaded portion of a container for the powder. This closure is provided with a flat disk-like portion 13 provided with oppositely disposed notches 14. An outer receptacle 15, which may be used as a tumbler or water container, is provided at its upper edge with oppositely disposed inwardly projecting hooks 16, and when the notches 14 are brought into coincidence with the hooks 16 the closure may be turned to secure the latter in place. Ribs or projections 17 are formed around the outer edge of the disk 13, and the hooks 16 engage these projections to prevent the closure from accidental displacement. A tooth brush holder 18 is formed on the outer receptacle 15. The inner receptacle 19 is a plain cylindrical bottle having a threaded neck which engages the threads 20 of the closure 12.

From the foregoing it will be obvious that the quantity of tooth powder necessary for cleaning the teeth at one time may be placed within the cup 4$^b$, and the brush after having been moistened may be placed in the cup to take up the powder without waste.

The device is comparatively inexpensive to manufacture and is simple in construction and efficient in operation.

Having thus described the invention, what is claimed as new, is:—

1. A powder container comprising an outer receptacle and an inner container, a closure for said container having a flat disk-like portion provided with peripheral notches, said receptacle having overhanging hooks to engage the disk-like portion of the closure, and the latter provided with a cup.

2. A powder container provided with a hollow threaded neck, an outer receptacle, a flat disk-like portion provided with peripheral notches, said receptacle having overhanging hooks to engage the disk like portion, a threaded neck on the disk-like portion to engage the hollow threaded neck of the container, a cup above the neck, and a brush holder formed upon the outer side of the outer receptacle.

In testimony whereof I affix my signature in presence of two witnesses.

GENNARO SPARANO.

Witnesses:
    GEORGE HAIGES,
    VITO SPERA.